May 22, 1956 L. T. ZATKO 2,746,307
ADJUSTABLE SHEAVE PULLEY
Filed Feb. 26, 1953

INVENTOR.
LESTER T. ZATKO
BY
Ely, Frye & Hamilton
ATTYS.

United States Patent Office 2,746,307
Patented May 22, 1956

2,746,307

ADJUSTABLE SHEAVE PULLEY

Lester T. Zatko, Cleveland, Ohio

Application February 26, 1953, Serial No. 338,938

1 Claim. (Cl. 74—230.17)

The present invention relates to a pulley construction and particularly to an adjustable sheave pulley adapted to be used with belts of various sizes.

Adjustable sheave pulleys have an extremely wide potential market because of their versatility as compared to non-adjustable pulleys. Their wide applicability relieves manufacturers of equipment utilizing pulleys of heavy parts inventories and of the problems arising from changes in belt size which may be necessitated by model changeovers. Although these advantages are recognized, they are generally outweighed by the cost of adjustable sheave pulleys built to meet the severe service standards which non-adjustable pulleys can fulfill at relatively low cost.

The object of the present invention is to provide an adjustable sheave pulley which is of durable construction and can be manufactured very economically so as to fulfill the requirements of a large portion of the pulley market which has been continuing to use non-adjustable pulleys because of the disadvantages of adjustable sheave pulleys noted above.

My pulley is constructed with a minimum of parts so fabricated that they provide for sheave adjustment while constituting, in their assembled form, an extremely durable pulley structure.

Other objects and advantages of my invention will appear in the following specification and in the accompanying drawings in which.

Figure 2:
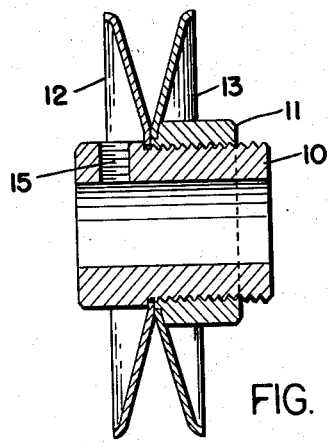
Figure 2 is a vertical sectional view of Figure 1.
Figure 1:
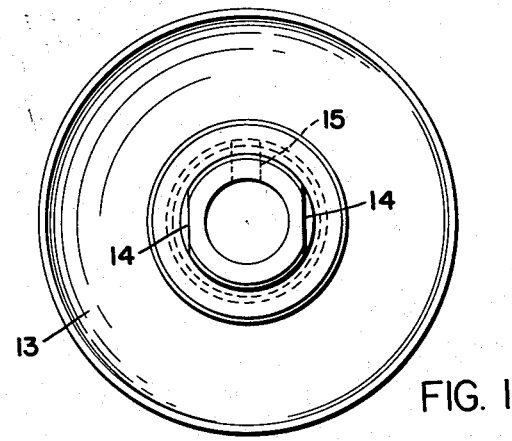
Figure 1 is a side elevation of my pulley.
Figure 4:
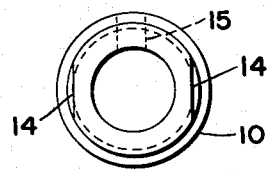
Figures 3 and 4 are, respectively, side and front views of the male hub nut employed in my pulley assembly.
Figure 3:
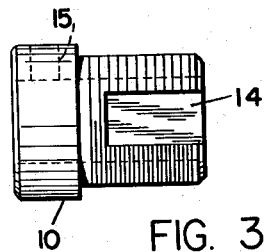
Figure 6:
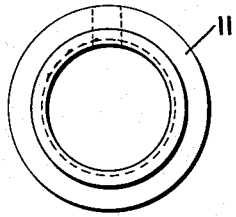
Figures 5 and 6 are, respectively, side and front views of the female hub nut employed in my pulley assembly.
Figure 5:
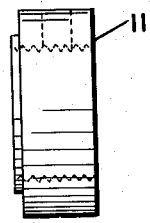

As may be seen in the drawings, my pulley comprises a male hub nut 10, a female hub nut 11, and a pair of sheaves 12 and 13. The male and female hub members may be formed from standard screw stock. The bore of the female nut 11 is threaded for engagement with the threaded small outside diameter of the male nut 10. This small outside diameter has a pair of diametrically opposed flats 14 formed thereon. The large diameter end of the male nut is drilled and tapped at 15 to receive a set-screw for engagement with the shaft upon which the pulley is to be mounted. The female nut 11 is also drilled and tapped to receive a set-screw for engagement with one of the flats 14.

Each hub nut has a single shoulder formed thereon for the reception of a sheave. The sheaves 12 and 13 are identical except for the diameter of the center hole, which is relatively wide on sheave 13 to accommodate the narrow diameter of the female nut 11 and is relatively narrow on sheave 12 to accommodate the smaller narrow diameter of the male nut 10. Each sheave is welded or otherwise suitably anchored to the shoulder of the nut with which it is associated.

When the pulley is under load, the torsional stresses running annularly in shear around the central portion of the hub assembly are more than adequately accommodated by the area of contact between each sheave and the shoulder of the nut with which it is associated. Axial loads due to the wedging action of the pulley belt are taken by the transverse faces of the apposite nut shoulders.

In the adjusted position shown in Figure 2, the inner rims of the sheaves bear against each other to reinforce each other against flexure, thus minimizing fatigue of the sheave walls. On the other hand, as the sheaves are moved apart, driving engagement with the belt tends to extend progressively radially inward approaching the condition where axial loads are absorbed directly by the faces of the nut shoulders with substantially no flexure of the sheave walls.

It will be evident that adjustment of the pulley is accomplished simply by threading the female nut on the male nut to the desired position and then tightening the set-screw carried by the female nut against one of the flats 14.

Several variations in the specific pulley construction I have disclosed will suggest themselves to those familiar with fabrications of assemblies of the type to which this application is directed. Accordingly, the scope of my invention is to be limited solely by the scope of the following claim.

What is claimed is:

An adjustable sheave pulley comprising a male hub nut having a bore, a great outer periphery and a small outer periphery, a step between said great and small peripheries on said male hub nut defining a first shoulder, said small periphery on said male hub nut being threaded and having at least one flat formed thereon, a tapped hole extending radially through said male hub nut for the reception of a set-screw, a female hub nut having a bore threaded for engagement with the threaded small periphery of said male hub nut, said female hub nut further having a great outer periphery and a small outer periphery, a step between said great and small peripheries on said female hub nut defining a second shoulder, a tapped hole extending radially through said female hub nut for the reception of a set-screw, a first pulley sheave mounted around said small periphery of said male hub nut and against said first shoulder, a second pulley sheave mounted around said small periphery of said female hub nut and against said second shoulder, said sheaves each comprising a wall of susbtantially uniform given thickness extending radially outwardly from said male and female hub nuts, said walls in cross-section being bent away from each other with an angle therebetween of less than 90 degrees, said first shoulder facing said second shoulder, the threads on said small periphery of said male hub nut and on said bore of said female hub nut being so related that said female hub nut may be threaded up on said male hub nut to a longitudinal distance from said first shoulder not greater than said given wall thickness, said given wall thickness being not less than the width of said small periphery on said female hub nut, whereby the inner rims of said sheaves are clamped between said male ad female hub nuts when said female hub nut is fully threaded up on said male hub nut.

References Cited in the file of this patent

UNITED STATES PATENTS

| 2,199,362 | Meyer | Apr. 30, 1940 |
| 2,401,178 | Oehler | May 28, 1946 |
| 2,577,516 | Firth | Dec. 4, 1951 |

FOREIGN PATENTS

| 25,180 | Great Britain | 1912 |